US008274738B2

(12) United States Patent
Hasman et al.

(10) Patent No.: US 8,274,738 B2
(45) Date of Patent: Sep. 25, 2012

(54) SPACE-VARIANT POLARIZATION MANIPULATION OF THERMAL EMISSION

(75) Inventors: Erez Hasman, Hadera (IL); Nir Dahan, Haifa (IL); Avi Niv, Upper Galilee (IL); Gabriel Biener, Haifa (IL); Vladimir Kleiner, Nesher (IL)

(73) Assignee: Technion Research & Development Foundation Ltd., Haifa (IL)

( * ) Notice: Subject to any disclaimer, the term of this patent is extended or adjusted under 35 U.S.C. 154(b) by 747 days.

(21) Appl. No.: 11/920,049

(22) PCT Filed: May 4, 2006

(86) PCT No.: PCT/IL2006/000533
§ 371 (c)(1),
(2), (4) Date: Sep. 25, 2008

(87) PCT Pub. No.: WO2006/117789
PCT Pub. Date: Nov. 9, 2006

(65) Prior Publication Data
US 2009/0009856 A1    Jan. 8, 2009

Related U.S. Application Data

(60) Provisional application No. 60/676,956, filed on May 3, 2005.

(51) Int. Cl.
*G02B 5/18* (2006.01)
(52) U.S. Cl. ...................................................... 359/573
(58) Field of Classification Search ............. 359/485.01, 359/485.05, 486.01, 487.03, 566–576
See application file for complete search history.

(56) References Cited

U.S. PATENT DOCUMENTS

| 5,847,872 A | 12/1998 | Ito | |
|---|---|---|---|
| 6,856,408 B2 | 2/2005 | Raymond | |
| 2003/0142400 A1* | 7/2003 | Hansen et al. | 359/486 |
| 2004/0027670 A1* | 2/2004 | Hasman et al. | 359/566 |
| 2004/0165269 A1* | 8/2004 | Hasman et al. | 359/573 |
| 2004/0223156 A1* | 11/2004 | McGrew et al. | 356/364 |
| 2006/0175551 A1 | 8/2006 | Fan | |

OTHER PUBLICATIONS

Biener et al., Near-field Fourier transform polarimetry by use of a discrete space-variant subwavelength grating, J. Opt. Soc. Am. A vol. 20, No. 10, p. 1940-1948 [Oct. 2003].*
Zeitner et al., Polarization multiplexing of diffractive elements with metal-stripe grating pixels, Applied Optics vol. 38, No. 11, p. 2177-2181 [1999].*
Dahan et al., "Space-variant polarization manipulation of a thermal emission by a SiO2 subwave length grating supporting surface phonon-polaritons"; Applied Physics Letters, AIP, American Institute of Physics, Melville, NY, US LNKD—DOI: 10.1063/1.1922084, vol. 86, No. 19, May 2, 2005, p. 191102, XP012065295, ISSN: 0003-6951.

(Continued)

*Primary Examiner* — Stephone Allen
*Assistant Examiner* — Kimberly N Kakalec
(74) *Attorney, Agent, or Firm* — Pearl Cohen Zedek Latzer, LLP

(57) ABSTRACT

A method for Space-variant polarization manipulation of enhanced nondirectional thermal emission in a narrow spectral peak is disclosed, comprising providing a subwavelength grating irradiating non-directional thermal emission on the grating and discretely controlling the local orientation of the grating.

12 Claims, 5 Drawing Sheets

OTHER PUBLICATIONS

Wang et al., "Polarized spectral emittance from periodic micromachined surfaces-III. Undoped silicon: The normal direction in shallow lamellar gratings", Infrared Physics, Pergamon LNKD—DOI: 10.1016/020-0891(91)90137-5, vol. 32, Jan. 1, 1991, pp. 477-488, XP025458486, ISSN: 020-0891.

Maruyama et al., "Thermal radiation from two-dimensionally confined modes in microcavities", Applied Physics Letters, AIP, American Institute of Physics, Melville, NY, US LNKD—DOI: 10.1063/1.1397759, vol. 79, No. 9, Aug. 27, 2001, pp. 1393-1395, XP012030184, ISSN: 0003-6951.

Le Gall et al., "Experimental and theoretical study of reflection and coherent thermal emission by a Sic grating supporting a surface photon polariton", Physical Review B, vol. 55, No. 15, Apr. 15, 1997, pp. 10, 106-110, 114, XP002593363.

Greffet et al., "Coherent emission of light by thermal sources", Nature, Nature Publishing Group, London, GB, LNKD—DOI: 10.1038/416061A, vol. 416, No. 6876, Mar. 7, 2002, pp. 61-64, XP002276869, ISSN: 0028-0836.

Bomzon et al., Space-variant polarization state manipulation with computer-generated subwave length metal stripe gratings: Optics Communications, North-Holland Publishing Co., Amsterdam, NL, LNKD—DOI: 10.1016/S0030-4018(01)01196-8, vol. 192, No. 3-6, Jun. 1, 2001, pp. 169-181, XP004243235, ISSN: 0030-4018.

Supplementary European Search Report mailed on Aug. 9, 2010 for European Patent Application No. 06728327.

International Search Report of Application No. PCT/IL06/00533 Mailed on Nov. 15, 2007.

\* cited by examiner

US 8,274,738 B2

SPACE-VARIANT POLARIZATION MANIPULATION OF THERMAL EMISSION

CROSS-REFERENCE TO RELATED APPLICATIONS

This application is a National Phase Application of PCT International Application No. PCT/IL2006/000533, entitled "SPACE-VARIANT POLARIZATION MANIPULATION OF THERMAL EMISSION", International Filing Date May 4, 2006, published on Nov. 9, 2006 as International Publication No. WO 2006/117789, which in turn claims priority from US Provisional Patent Application No. 60/676,956, filed May 3, 2005, both of which are incorporated herein by reference in their entirety.

FIELD OF THE INVENTION

The present invention relates to thermal emission. More particularly it relates to space-variant polarization manipulation of thermal emission obtained with subwavelength grating supporting surface phonon-polarization or surface plasnom-polarization.

BACKGROUND OF THE INVENTION

Thermal emission from absorbing material is considered to be incoherent and unpolarized, and accordingly is regarded as spontaneous emission. The surface properties of the absorbing material have a profound impact on the emission's optical properties, and can be manipulated to produce a partially coherent and partially polarized radiation emission. Recently, it was shown that by etching a uniform grating on a SiC substrate, a highly directional peak of thermal emission was achieved. Furthermore, spectral resonance and nondirectional emission were observed at certain frequencies. In these instances, a connection between the emission and the surface properties was established by studying the excitation of surface phonon-polaritons (SPPs). The underlying microscopic origin of the SPP is the mechanical vibration of the atoms. A surface polariton (phonon or plasmon) has a longer wave vector than the light waves propagating along the surface with the same frequency. For this reason, they are called "nonradiative" surface polaritons. By coupling the surface polaritons with the propagating wave by means of an additional prism or grating, one can produce either increased resonant absorption or directional emission. Because SPPs or surface plasmon-polaritons are able to be excited only by TM-polarized propagating waves, the emission's characteristics have to be polarization-dependent. The TM polarization state has an electric-field component that is parallel to the grating vector (see inset in FIG. 1(a) for TE and TM definitions).

SUMMARY OF THE PRESENT INVENTION

There is thus provided, in accordance with some preferred embodiments of the present invention a method for Space-variant polarization manipulation of enhanced nondirectional thermal emission in a narrow spectral peak comprising providing a subwavelength grating irradiating non-directional thermal emission on the grating and discretely controlling the local orientation of the grating.

Furthermore, in accordance with some preferred embodiments of the present invention, the thermal emission is in infrared range.

Furthermore, in accordance with some preferred embodiments of the present invention, the method further comprises providing a thermal imaging sensor for imaging the thermal emission.

Furthermore, in accordance with some preferred embodiments of the present invention, the method further comprises designing the spatial orientation of the grating with a random key for optical encryption of information.

Furthermore, in accordance with some preferred embodiments of the present invention, the method further comprises decrypting the encrypted information using an imaging sensor for obtaining image data corresponding to the thermal emission off the grating and processing the image data using a correct key.

Furthermore, in accordance with some preferred embodiments of the present invention, the method is used for spatially modulated heat transfer.

Furthermore, in accordance with some preferred embodiments of the present invention, the method is used for formation of high efficiency thermal sources.

Furthermore, in accordance with some preferred embodiments of the present invention, the grating is provided on material selected from polar materials in a spectral range where $\epsilon'<-1$, where $\epsilon'$ is the real part of the dielectric constant of the polar material.

Furthermore, in accordance with some preferred embodiments of the present invention, the grating is provided on a substrate made from a conductive material.

Furthermore, in accordance with some preferred embodiments of the present invention, the grating is provided on a substrate made from a dielectric material.

Furthermore, in accordance with some preferred embodiments of the present invention, the grating is provided on a substrate made from fused silica.

Furthermore, in accordance with some preferred embodiments of the present invention, surface plasmon polaritons are excited.

Furthermore, in accordance with some preferred embodiments of the present invention, the grating comprises spiral elements.

Furthermore, in accordance with some preferred embodiments of the present invention, the spiral elements have a discrete local groove orientation of $\phi=m\omega/2$, where m is the polarization order and $\omega$ is the azimuthal angle of the polar coordinates.

BRIEF DESCRIPTION OF THE FIGURES

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

Figure 1:
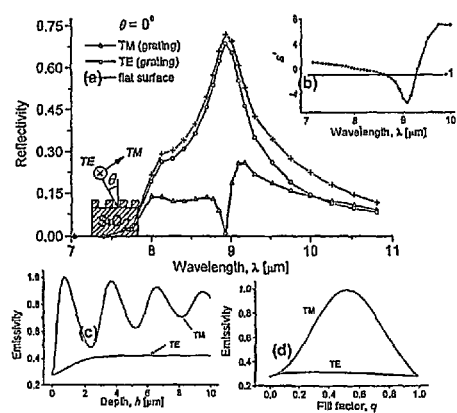
FIG. 1 illustrates in (a) The calculated $SiO_2$ spectral reflectance in normal direction for a flat surface (crosses), in (b) the spectral dependence of the real part of the $SiO_2$ dielectric constant, $\epsilon'$, in (c) the calculated emissivity vs. grating depth for TM and TE polarizations, in (d) the calculated emissivity vs. grating fill factor (q) for TM and TE polarizations.

We introduce a theoretical and experimental investigation of space-variant polarization-dependent thermal emission by exploiting the polarization dependence of the SPPs (or surface plasmon-polaritons) in different material configuration. Computer-generated subwavelength gratings etched on fused silica (SiO$_2$) substrates are used to generate space-variant polarization radiation. As a first step, we designed a grating to enhance the nondirectional thermal emission to form a narrow spectral peak for TM polarization. We were then able to experimentally demonstrate space-variant polarization manipulation of thermal emission by discretely controlling the local orientation of the grating. To the best of our knowledge, this was the first time that space-variant polarization manipulation of infrared thermal emission had been achieved. This phenomenon can be exploited in a variety of applications such as thermal polarization imaging, optical encryption, spatially modulated heat transfer and the formation of high efficiency thermal sources.

SPPs are supported by polar materials in the spectral range where $\epsilon'<-1$ ($\epsilon'$ is the real part of the dielectric constant). There are two kinds of materials that support surface waves: conductive materials that support surface plasmon-polaritons, and dielectric materials that support SPPs. As can be seen in FIG. 1(b), fused silica behaves as a polar material in the spectral range of 8.65 µm to 9.18 µm. Our goal was to design a grating on a SiO$_2$ substrate for which nondirectional emission was restricted to a narrow spectral band. In opaque materials the emissivity ($\epsilon$) is related to the reflectance (R) via Kirchhoff's law, $\epsilon=1-R$ for each direction, wavelength, temperature and polarization. In order to maximize the emissivity, we optimized the SiO$_2$ grating using a spectral reflectance calculation by rigorous coupled wave analysis (RCWA). FIG. 1(c) shows the calculation of the emissivity as a function of the grating depth for normal incident light with a wavelength of 8.93 µm. There is a strong variation in the emissivity as a function of the grating depth only for TM polarization. The dependence of the emissivity as a function of the grating's fill factor (q) was also calculated with the previous parameters, but with a grating depth of 0.7 µm as shown in FIG. 1(d). The optimal grating parameters were determined to be: period $\Lambda=2$ µm, fill factor q=0.5 and grating depth h=0.7 µm.

FIG. 1(a) shows the calculated spectral reflectance of the grating for TE and TM polarization states as well as that of the flat surface for normal incident light. Note that for $\lambda=8.93$ µm, the TE reflection coincides with the reflectance of the flat surface, while the TM reflection is close to zero. We ascribe the spectral resonance of the reflectance to the excitation of SPPs. According to Kirchhoff's law, we expected to obtain a high discrimination between the emissivity of the TE and TM polarizations. As a next step we defined the emissivity modulation to be $\eta=|(\epsilon_{TM}-\epsilon_{TE})/(\epsilon_{TM}+\epsilon_{TE})|$, where $\epsilon_{TM}$ and $\epsilon_{TE}$ are the emissivity values for the TM and TE polarization states, respectively. The optimized grating parameters cited above yielded a high emissivity modulation of $\eta=0.52$ for angles up to 30°.

In order to confirm our theoretical predictions, we formed a 10 mm×10 mm uniform grating on an amorphous SiO$_2$ substrate using advanced photolithographic techniques. A Cr film was deposited on a SiO$_2$ substrate and overcoated with a positive photoresist. After exposing the photoresist through a mask, it was developed leaving a strip pattern on the Cr film. A Cr etchant was then applied to remove the Cr film from the exposed areas. At this point the photoresist was removed and the substrate etched by reactive ion etching (RIE) through the Cr strips, which served as a mask. The RIE was performed at a power of 175 W and a pressure of 40 mTorr with CF$_4$ and O$_2$ gas flow rates of 13.8 and 1.2 sccm, respectively. The etching, performed at a rate of 35 Å per minute at room temperature, was continued until the desired depth was reached. As a final step the remaining Cr was removed with a Cr etchant.

Figure 2:
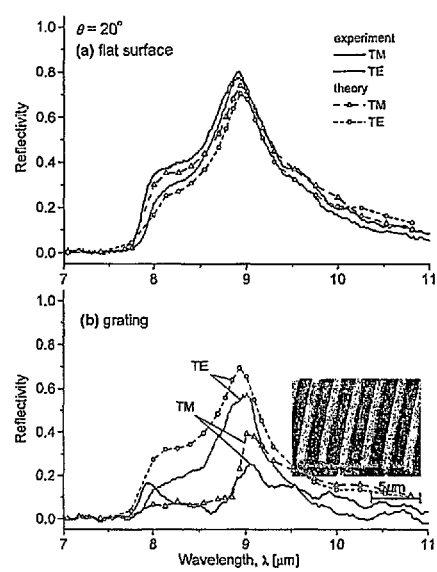
FIG. 2 illustrates measured and calculated spectral reflectance with an incidence angle of $\theta=20°$ of a (a) flat surface (b) uniform $SiO_2$ grating.

The inset in FIG. 2(b) shows a scanning electron microscope (SEM) image of the grating. Due to inaccuracies in fabrication, the actual fill factor was 0.3 instead of 0.5. For this fill factor the optimal depth was determined to be 0.8 µm instead of 0.7 µm. We began by illuminating the grating with an infrared source (SiC 1270° K., SP-Oriel 80007) at an incidence angle of 20°. We measured the reflectance for both polarization states with an infrared Fourier transform spectrometer (FTIR, SP-Oriel MIR 8000, resolution 4 cm$^{-1}$) equipped with a cooled HgCdTe detector (SP-Oriel 80026). FIG. 2 shows the measured and the calculated spectral reflectance values at 20° incidence to a flat surface and to the grating. The results are in good agreement with the calculated values for both polarizations. For these grating parameters we obtained an emissivity modulation of $\eta=0.33$.

Figure 3:
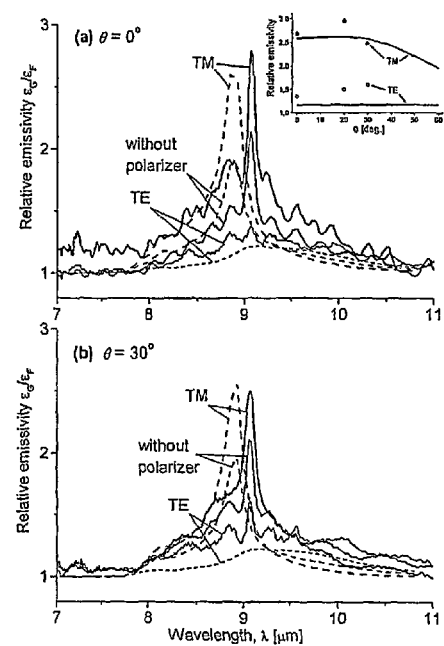
FIG. 3 illustrates measured (solid) and calculated (dashed) relative emissivity spectrum of the grating for TM, TE and total (without a polarizer) emission in (a) normal observation direction $\theta=0°$ and (b) in $\theta=30°$.

Spectral measurements of the emissivity were then performed by use of FTIR. In this experiment, the sample was heated to 873° K. with a precision better than 1° K. (heater and temperature-controller from HeatWave Labs Inc.). FIG. 3 shows the measured and calculated spectral dependence of the relative emissivity for TM and TE polarizations, as well as without a polarizer, in a normal emission direction and for $\eta=300$. The relative emissivity is defined as the grating emissivity ($\epsilon_G$) normalized to the emissivity of the flat surface ($\epsilon_F$) for each case. A narrow spectral peak of $\Delta\lambda=90$ nm was obtained for TM polarization around a wavelength of 9.07 µm. Its relative emissivity was 2.75, while the relative emissivity of TE polarization was approximately unity. The measured peak wavelength of the relative emissivity was shifted with respect to the predicted value. This results from temperature-related variations in the dielectric constant. The inset in FIG. 3(a) shows both experimental and calculated relative emissivity as a function of the emission angle, and indicates that the peak emissivity was nondirectional. Coupling of the emission in any direction is possible if the SPP dispersion relation is flat.

Finally, in order to demonstrate space-variant polarization-dependent thermal emission, we formed four space-variant spiral elements having a discrete local groove orientation of $\phi=m\omega/2$, where m is the polarization order and $\omega$ is the azimuthal angle of the polar coordinates. The elements were 10 mm in diameter with 16 discrete levels and designed for polarization order numbers of m=1, 2, 3 and 4. SEM images of the central area of the elements are shown in FIG. 4(a). FIG. 4(b) shows the spatial thermal emission distributions after emerging from the spiral elements at 353° K., then passed through a linear polarizer and captured by a thermal camera (CEDIP, 320×240 pixels). Space-variant spiral-like intensity modulation, resulting from the space-variant polarization-dependent emissivity, is clearly observed. The distribution of the emissions from the spiral elements not passed through a polarizer is shown in FIG. 4(c) in which the black lines indicate the local TM polarization orientation. In this case, the emission distribution is almost uniform. However, an axially symmetric polarization orientation is obtained in the near-field for the enhanced TM emission. As expected from FIG. 3, the total intensity emitted from the grating is higher than from the flat surface emission due to the enhanced TM emission.

In this section, we briefly present a novel approach for optical encryption by using the polarization dependence of thermal emission supporting SPPs or surface plasmon-polaritons. Computer-generated subwavelength grating etched on fused silica ($SiO_2$) substrate is used to generate space-variant polarization radiation. As we have shown, the orientation of the local grating relative to the orientation of the polarizer determines the intensity detected by the camera. Let us have an image, as shown in FIG. 5(a), which has to be encrypted with a random key (for example, FIG. 5(b)). By designing the spatial orientation of the gratings we produced an encrypted image. A magnified area of the element by SEM is shown in FIG. 5(c). A thermal camera is used to capture the emerging radiation through a linear polarizer. The intensity picture in FIG. 5(d) is obtained when the polarizer is sited to zero. The decryption process was done by software using the correct key. The decrypted image shown in FIG. 5(e) was attained by calculating the Stokes parameters when applying the intensities, and applying the correct key. A case in which the wrong key is used, as depicted in FIG. 5(f), the resulting decrypted image would show only white noise as can be seen in FIG. 5(g), with no possibility of reconstructing the original image. To the best of our knowledge, this is the first time that optical encryption based on thermal emission supporting SPPs has been achieved.

In conclusion, we have demonstrated a narrow spectral relative emissivity peak for a broad range of observations for a $SiO_2$ grating. The enhanced thermal infrared radiation, which was obtained only with TM polarization, was attributed to the excitation of SPPs. In the case of interface between conductive and dielectric materials the enhance emission is attributed to surface plasmon-polaritons. Using the polarization dependence of the emissivity, a space-variant polarization manipulation of the thermal emission was experimentally demonstrated by controlling the local orientation of the subwavelength grating.

Reference is now made to the figures.

FIG. 1. (a) The calculated $SiO_2$ spectral reflectance in normal direction for a flat surface (crosses), and for a grating with period $\Lambda=2$ µm, fill factor $q=0.5$ and depth $h=0.7$ µm for TM polarization (triangles) and TE polarization (circles). The inset illustrates the illumination scheme of the grating. (b) The spectral dependence of the real part of the $SiO_2$ dielectric constant, $\epsilon'$. (c) The calculated emissivity vs. grating depth for TM and TE polarizations for a wavelength of 8.93 µm in normal direction of light, with grating parameters of: period $\Lambda=2$ µm, fill factor $q=0.5$. (d) The calculated emissivity vs. grating fill factor (q) for TM and TE polarizations for a wavelength of 8.93 µm in normal direction of light, with grating parameters of: period $\Lambda=2$ µm, depth=0.7 µm.

FIG. 2. Measured and calculated spectral reflectance with an incidence angle of $\theta=20°$ of a (a) flat surface (b) uniform $SiO_2$ grating. The grating parameters of: $\Lambda=2$ µm, fill factor $q=0.3$ and depth $h=0.8$ µm; the experimental results for TE and TM (solid lines), calculated results for TE (dashed line with circles) and for TM polarization (dashed line with triangles). The inset shows a scanning electron microscope (SEM) image of the grating.

FIG. 3. Measured (solid) and calculated (dashed) relative emissivity spectrum of the grating for TM, TE and total (without a polarizer) emission in (a) normal observation direction $\theta=0°$ and (b) in $\theta=30°$. Inset shows the measured and calculated (solid lines) relative emissivity as a function of observation angle for TM (triangle) and TE (circle) polarization.

Figure 4:
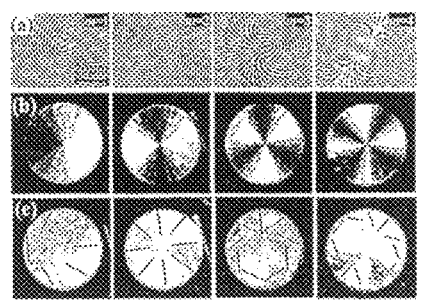
FIG. 4 illustrates in (a) a scanning electron microscope (SEM) image of the spiral subwavelength elements with polarization order numbers m=1, 2, 3 and 4. Thermal emission images emerging from the SiO$_2$ spiral elements (b) captured through a polarizer, and (c) without a polarizer, for m=1, 2, 3, 4.

FIG. 4. (a) A scanning electron microscope (SEM) image of the spiral subwavelength elements with polarization order numbers m=1, 2, 3 and 4. Thermal emission images emerging from the $SiO_2$ spiral elements (b) captured through a polarizer, and (c) without a polarizer, for m=1, 2, 3, 4. The elements were uniformly heated to a temperature of 353° K. The lines indicate the local TM polarization orientation measured in the near-field.

Figure 5:
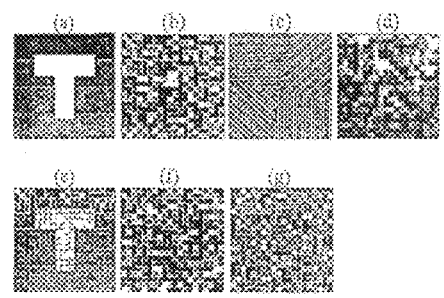
FIG. 5 illustrates in (a) image intensity to be encrypted, in (b) the correct key function in gray level composite of 20×20 pixels array, in (c) a SEM image of four pixels of the encrypted element, in (d) intensity picture of the encrypted element through a linear polarizer talken by a thermal camera, in (e) decrypted image achieved by decryption process calculating Stokes parameters applying intensities pictures and the correct key, in (f) wrong key function in gray level, and in (g) decrypted image resulted from using the wrong key.

FIG. 5. (a) Image intensity to be encrypted. (b) The correct key function in gray level composite of 20×20 pixels array. (c) A SEM image of four pixels of the encrypted element. (d) Intensity picture of the encrypted element through a linear polarizer taken by a thermal camera. (e) Decrypted image achieved by decryption process calculating Stokes parameters applying intensities pictures and the correct key. (f) Wrong key function in gray level. (g) Decrypted image resulted from using the wrong key.

To conclude, space-variant polarization manipulation of enhanced nondirectional thermal emission in a narrow spectral peak was presented hereinabove. The emission is attributed to surface phonon-polariton excitation from space-variant subwavelength $SiO_2$ gratings, or surface plasmon-polaritons excitation from metal-dielectric interface. Polarization manipulation was obtained by discretely controlling the local orientation of the grating. We experimentally demonstrated thermal emission in an axially symmetric polarization distribution. Theoretical calculations based on rigorous coupled-wave analysis are presented along with experimental results.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A method for space-variant manipulating of thermal emission from a surface of a material that supports surface waves, the method comprising:
   providing on the surface of the material a grating with a spatially varying grating parameter for optical encryption of information; and
   imaging the thermal emission.

2. The method of claim 1, wherein the grating parameter is selected from the group of grating parameters consisting of grating orientation, grating period, grating fill factor and grating depth.

3. The method of claim 1, further comprising decrypting the imaged thermal emission.

4. The method of claim 1, wherein the grating with a spatially varying grating parameter is designed with a key function.

5. The method of claim 4, further comprising decrypting the imaged thermal emission based on the key function.

6. The method of claim 1, wherein the spatially varying grating parameter varies discretely.

7. A method for optical encryption of information, the method comprising providing a grating with a spatially varying grating parameter on a surface of a material that supports surface waves, wherein the spatially varying grating parameter is designed to so as to include optically encrypted information.

8. The method of claim 7, wherein the grating parameter is selected from the group of grating parameters consisting of grating orientation, grating period, grating fill factor and grating depth.

9. The method of claim 7, further comprising imaging the thermal emission and decrypting the optically encrypted information from the imaged thermal emission.

10. The method of claim 7, wherein the grating with a spatially varying grating parameter is designed with a key function.

11. The method of claim 10, further comprising imaging the thermal emission and decrypting the optically encrypted information from the imaged thermal emission based on the key function.

12. The method of claim 7, wherein the spatially varying grating parameter on the surface of the material varies discretely.

* * * * *